(12) United States Patent
Miao et al.

(10) Patent No.: US 9,418,147 B2
(45) Date of Patent: *Aug. 16, 2016

(54) METHOD AND APPARATUS OF DETERMINING PRODUCT CATEGORY INFORMATION

(71) Applicant: Alibaba Group Holding Limited, Grand Cayman (KY)

(72) Inventors: Wen Yan Miao, Hangzhou (CN); Jian Ping Qian, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 10 days.

This patent is subject to a terminal disclaimer.

(21) Appl. No.: 14/478,867

(22) Filed: Sep. 5, 2014

(65) Prior Publication Data

US 2014/0379724 A1 Dec. 25, 2014

Related U.S. Application Data

(63) Continuation of application No. 13/518,267, filed as application No. PCT/US2012/031875 on Apr. 2, 2012, now Pat. No. 9,047,369.

(30) Foreign Application Priority Data

Apr. 14, 2011 (CN) .......................... 2011 1 0093430

(51) Int. Cl.
*G06F 17/30* (2006.01)
(52) U.S. Cl.
CPC .... *G06F 17/30707* (2013.01); *G06F 17/30598* (2013.01)

(58) Field of Classification Search
USPC ......................................................... 707/740
See application file for complete search history.

(56) References Cited

U.S. PATENT DOCUMENTS

| | | | |
|---|---|---|---|
| 6,728,696 B1 | 4/2004 | Walton | |
| 6,947,936 B1 | 9/2005 | Suermondt et al. | |
| 7,082,426 B2 | 7/2006 | Musgrove et al. | |
| 7,603,367 B1 | 10/2009 | Kanter et al. | |
| 7,617,200 B2 | 11/2009 | Budzik et al. | |

(Continued)

FOREIGN PATENT DOCUMENTS

| | | |
|---|---|---|
| JP | 2003528359 A | 9/2003 |
| JP | 2006527886 A | 12/2006 |
| WO | WO2011037603 A1 | 3/2011 |

OTHER PUBLICATIONS

Translated Chinese Office Action mailed Sep. 2, 2014 for the Chinese patent application No. 201110093430.9, a counterpart foreign application of U.S. Appl. No. 13/518,267, 9 pages.

(Continued)

*Primary Examiner* — Debbie Le
(74) *Attorney, Agent, or Firm* — Lee & Hayes, PLLC

(57) ABSTRACT

A user may submit product title information to a server. The server may generate a phrase based on the product title information. The server may then search a database to find relevancies between the phrase and product categories corresponding to multiple nodes in a product category tree. Based on the relevancies, the server may select a node from the multiple nodes. The server may associate the product title information with the node corresponding to a product category when the node is a leaf node of the product category tree.

19 Claims, 6 Drawing Sheets

(56) References Cited

U.S. PATENT DOCUMENTS

| | | | |
|---|---|---|---|
| 7,809,672 | B1 | 10/2010 | Tenorio |
| 7,870,039 | B1 | 1/2011 | Dom et al. |
| 8,145,662 | B2 * | 3/2012 | Chen ................. G06F 17/30598 707/767 |
| 8,700,494 | B2 | 4/2014 | Carlson et al. |
| 8,812,420 | B2 | 8/2014 | Wang |
| 2001/0025277 | A1 | 9/2001 | Hyldahl |
| 2002/0013778 | A1 | 1/2002 | Neal et al. |
| 2004/0024769 | A1 | 2/2004 | Forman et al. |
| 2006/0212287 | A1 * | 9/2006 | Bigalet ............... G06F 17/2735 704/10 |
| 2007/0299743 | A1 * | 12/2007 | Staib .................... G06Q 10/107 705/7.33 |
| 2009/0222485 | A1 | 9/2009 | Wassmann et al. |
| 2010/0094875 | A1 | 4/2010 | Harrison et al. |
| 2010/0169361 | A1 * | 7/2010 | Chen ................. G06F 17/30598 707/769 |
| 2011/0071917 | A1 | 3/2011 | Bolivar |
| 2012/0005044 | A1 | 1/2012 | Coleman |
| 2012/0066253 | A1 | 3/2012 | Osborn et al. |
| 2013/0060662 | A1 | 3/2013 | Carlson et al. |
| 2013/0304687 | A1 | 11/2013 | Wang |

OTHER PUBLICATIONS

Office Action for U.S. Appl. No. 13/518,267, mailed on Dec. 17, 2014, Wen Yan Miao, "Method and Apparatus of Determining Product Category Information," 9 pages.

The Extended European Search Report mailed Oct. 2, 2014 for European Patent Application No. 12770669.5, 7 pages.

Translated Japanese Office Action mailed Mar. 1, 2016 for Japanese patent application No. 2014-505177, a counterpart foreign application of U.S. Pat. No. 9,047,369, 7 pages.

The Chinese Office Action mailed Jan. 26, 2014 for the Chinese patent application No. 201110093430.9, a counterpart foreing application of U.S. Appl. No. 13/518,267, 9 pages.

Office Action for U.S. Appl. No. 13/518,267, mailed on Nov. 6, 2013, Wen Yan Miao, "Method and Apparatus of Determining Product Category Information," 8 pages.

Final Office Action for U.S. Appl. No. 13/518,267, mailed on Apr. 16, 2014, Wen Yan Miao, "Method and Apparatus of Determining Product Category Information," 11 pages.

The PCT Search Report mailed Jul. 6, 2012 for PCT application No. PCT/US12/31875, 7 pages.

* cited by examiner

METHOD AND APPARATUS OF DETERMINING PRODUCT CATEGORY INFORMATION

CROSS REFERENCE TO RELATED PATENT APPLICATIONS

This application is a continuation of and claims priority to U.S. patent application Ser. No. 13/518,267, filed on Jun. 21, 2012, which is national stage application of an international patent application PCT/US12/31875, filed Apr. 2, 2012, which claims priority to Chinese Patent Application No. 201110093430.9, filed on Apr. 14, 2011, entitled "METHOD AND APPARATUS OF DETERMINING PRODUCT CATEGORY INFORMATION," which applications are hereby incorporated by reference in their entirety.

TECHNICAL FIELD

This disclosure relates to the field of data processing. More specifically, the disclosure relates to a method and an apparatus of determining product category information.

BACKGROUND

When a user uploads information of products through a server, the user needs to determine a category of the uploaded product according to product category information provided by the server, and associate the category with the information of the products. However, conventional technologies of determining product category information may present some problems (e.g., inaccurate results and inefficiency). For example, it may be difficult to select proper category when the product category information provided by the server is complex.

SUMMARY OF THE DISCLOSURE

This disclosure provides methods and devices for determining product category information. In some embodiments, a user may submit product title information to a server. The server may generate a phrase based on the product title information. The server may then search a database to find relevancies between the phrase and product categories corresponding to multiple nodes in a product category tree. Based on the relevancies, the server may select a node from the multiple nodes. The server may associate the product title information with the node corresponding to a product category when the node is a leaf node of the product category tree.

In some embodiments, the server may select a node of a product category tree. The node may correspond to a product category that includes multiple product titles. The server may generate a phrase based on a product title of the multiple product titles, and then calculate a relevancy between the phrase and the product category based on relationship between the phrase and the multiple product titles.

BRIEF DESCRIPTION OF THE DRAWINGS

The Detailed Description is described with reference to the accompanying figures. The use of the same reference numbers in different figures indicates similar or identical items.

DETAILED DESCRIPTION

The disclosure introduces a method, a system and an apparatus of determining product category information for improving accuracy and efficiency of searching product categories with which a product may be associated. A relevancy between product information and corresponding product category information may be calculated and stored in a database. The product information may be provided by a user, and the corresponding product category information may be provided by a service provider. As one example, the relevancy may be stored in the database as Product_ID-Product_Title_Information-Product_Category_ID.

The product category may be a product category corresponding to a leaf node of a product category tree. In the product category tree, there are higher level nodes of the leaf node (e.g., parent nodes), while there are no lower level nodes of the leaf node (e.g., child nodes). The product information may be associated with the product category corresponding to the leaf node. In addition, because of the relationship between parent nodes and their child nodes, each corresponding node is determined from a root node to child nodes connected to the root node, and eventually to a corresponding leaf node during the determination of the product category. Therefore, in a product category tree, the product information may be associated with the leaf node, and product categories corresponding to parent nodes of the leaf node may include the product information.

Figure 1:
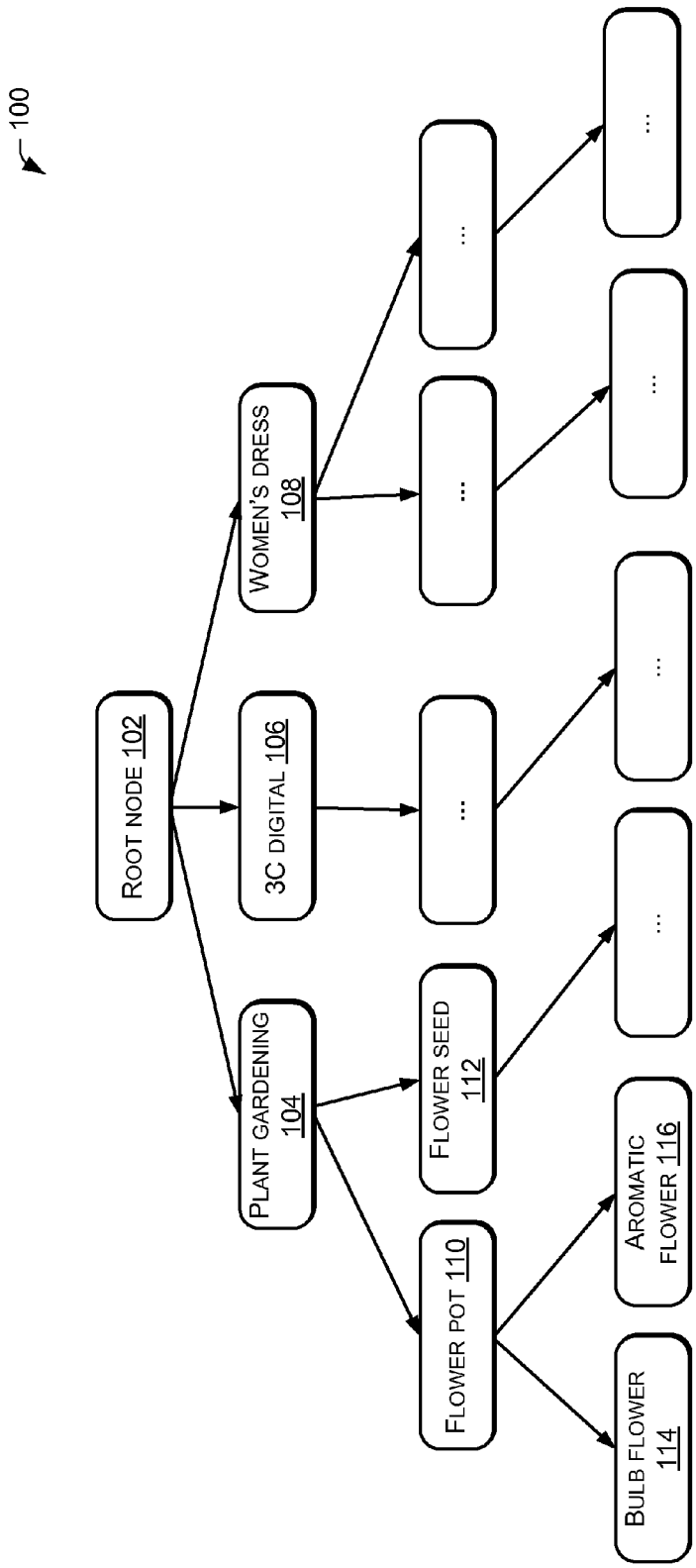
FIG. 1 is a block diagram of an illustrative structure of an example product category tree.

FIG. 1 is a block diagram of an illustrative structure of an example product category tree 100. The product category tree 100 may include a root node 102, which may include three child nodes: a plant gardening node 104, 3C digital node 106, and women's dress node 108, which correspond to three product categories. The plant gardening node 104 may further include two child nodes: a flower pot node 110 and a flower seed node 112. The flower pot node 110 may further include two child nodes: a bulb flower node 114 and an aromatic flower node 116.

The bulb flower node 114 and the aromatic flower node 116 may be leaf nodes, which correspond to product categories of bulb flowers and aromatic flowers respectively. Product information may be associated with product categories corresponding to the bulb flower node 114 and the aromatic flower node 116. After the product information is associated with a leaf node (e.g., the bulb flower node 114), associated higher-level nodes of this leaf node (e.g., the flower pot node 110 and plant gardening node 104) may include the product information as well. For example, a path from the leaf node to a particular associated higher-level node in the product category tree is reserved in the database after the product information is associated with the leaf node. Therefore, a relevancy between the product information and associated product category information reserved in the database can be shown as: Product_ID-Product_Title_Information-Associated_Root_Node_ID-Associated_Parent_Node_ID.

Figure 2:
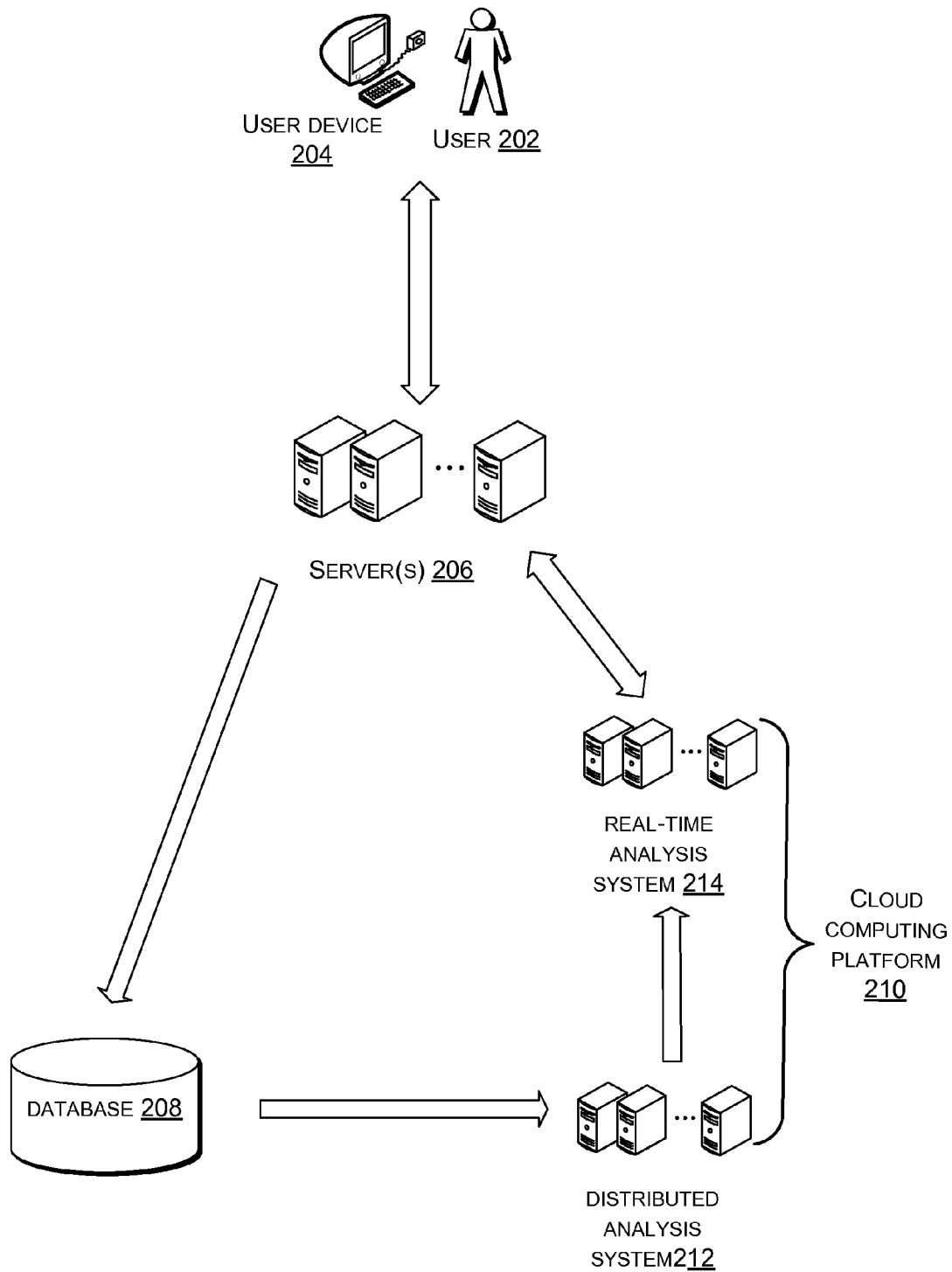
FIG. 2 is a block diagram of an illustrative architecture to determine product category information.

FIG. 2 is a block diagram of an illustrative architecture 200 to determine product category information. Under the architecture 200, a user 202 may, via a user device 204, log in and provide product information to a server 206, which may provide a product category tree to the user 202. The user 202 may choose a product category corresponding to a leaf node by selecting children or grandchildren nodes of the root node, and then the server 206 may associate the product information to the product category. The server 206 can be implemented as a web server. After the server 206 associate the product information to the product category, the server 206 may transmit related information to a database 208 for storage. In some embodiments, a cloud computing platform 210 may be implemented. For example, the cloud computing platform 210 may include Hadoop.

The cloud computing platform 210 may include a distributed analysis system 212 and a real-time analysis system 214. In some embodiments, the cloud computing platform 210 may receive periodically the related information from the database 208. The cloud computing platform 210 may store the product information and the associated product category information, analyze the information, and determine the relevancy between the product information and the product category. For example, the cloud computing platform 210 may determine a relevancy between each phase of the product information and each corresponding product category of the product category tree. In some embodiments, the distributed analysis system 212 and the real-time analysis system 214 may be implemented to determine the relevancy. The distributed analysis system 212 may be an off-line distributed analysis system, and the real-time analysis system 214 may be an online real-time analysis system. The cloud computing platform 210 may further provide information associated with relevancies to the server 206 to determine the product category information.

Figure 3:
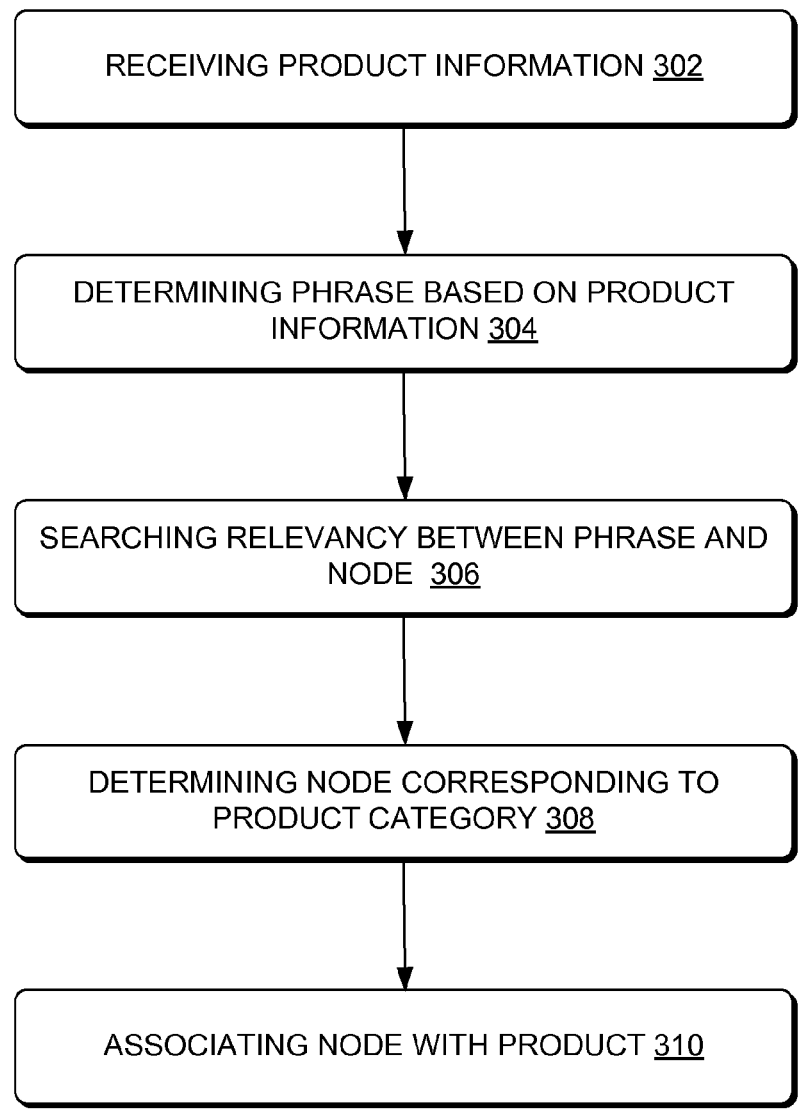
FIG. 3 is a flow diagram of an illustrative process to determine product category information.

FIG. 3 is a flow diagram of an illustrative process 300 to determine product category information. At 302, the server 206 may receive product information, which may be submitted by the user 202. The product information may include product title information and other description information of products. In some embodiments, the server 206 may receive the product information from other servers while incorporating the product information in other servers into the database.

At 304, the server 206 may conduct word segmentation on the product title information to determine each phrase including one or more word segments and corresponding to the product title. In some embodiments, the word segment may be a word and/or character, or multiple words and/or characters. At 306, the server 206 may search a relevant value between each phrase and each child node (e.g., the plant gardening node 104, the 3C digital node 106 and the woman's dress node 108) of a root node (e.g., the root node 102). The server 206 may determine relevancies between phrases and product categories based on relevant values between phrases and each child node. Therefore, the server 206 may determine a relevancy between each phrase and each product category.

At 308, the server 206 may determine a particular node corresponding to the product information based on the relevancy between each phrase and each child node. In some embodiments, the server 206 may select child nodes that have relevant values regarding a certain phrase grater than a predetermined relevant value. In some embodiments, the server 206 may further determine a sum relevancy between all phrases derived from the product title information and a product category corresponding to each selected child node. In some embodiments, the server 206 may select a product category corresponding to the product title information such that the product category has the greatest sum relevancy than other product category.

At 310, the server 206 may set a child node of the root node that corresponds to the product category as a parent node. The server 206 may then associate products corresponding to the product title information to a product category corresponding to a leaf node derived from the parent node.

Figure 4:
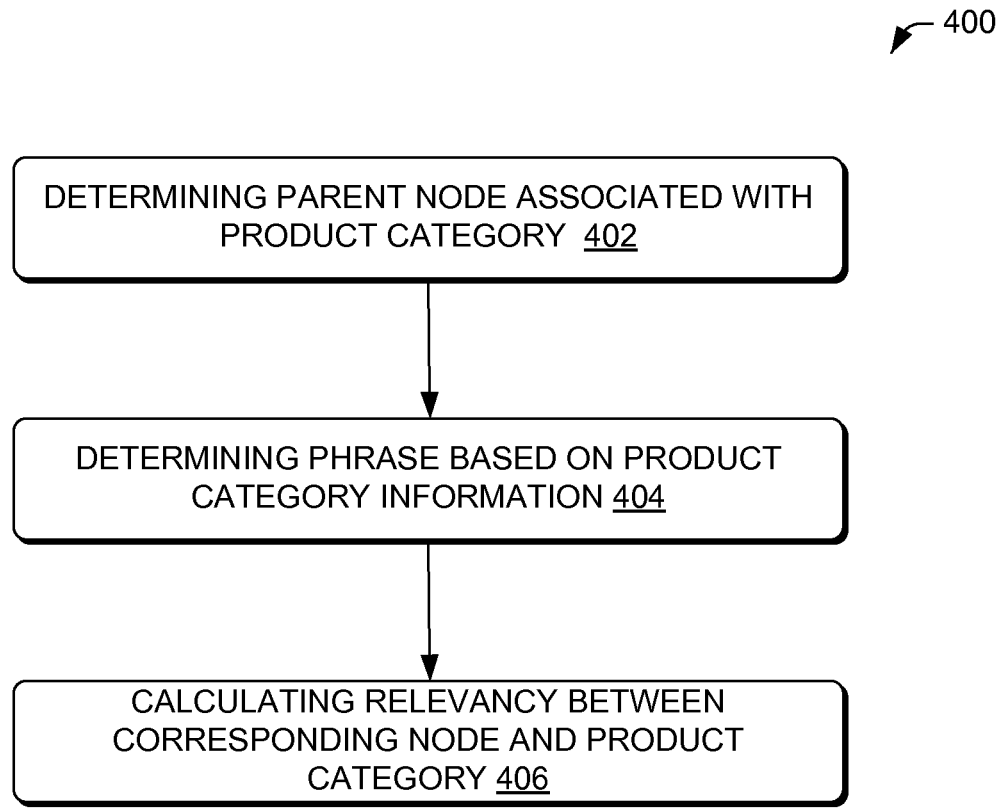
FIG. 4 is a flow diagram of an illustrative process to calculate relevancy between product information and product category.

FIG. 4 is a flow diagram of an illustrative process 400 to calculate relevancy between product information and product category. At 402, the server 206 may determine a parent node corresponding to a node of each product category. In some embodiments, a product category may be the category to which each product belongs. Each product category may correspond to a node of a product category tree, and the node with which the product information associated with may be the leaf node. In the product category tree 100, starting from the root node of the product category tree, the nodes are connected with each other. The root node has child nodes, leaf nodes only have parent nodes, and middle nodes have parent nodes and child nodes.

At 404, the server 206 may determine phrases corresponding to product title information of each produce included in the node. In some embodiments, the server 206 may conduct word segmentation on the product title information to determine one or more phrases corresponding to the product title. Each of the phrases may include one or more word segments. For each phrase, the server 206 may determine a relevant value between the phrase and the parent node based on a number that the phrase is contained in product titles included in the product category corresponding to the parent node. The relevant value may determined based further on a number that the phrase is contained in product titles included in the product category corresponding to the node, and numbers of products included in product categories corresponding to the node and the parent node respectively.

For example, the server 206 may determine a weighting of the phrase and the corresponding node based on the number that the phrase is contained in product titles included in the product category corresponding to the node, and a number of products included in a product category corresponding to the node. The server 206 may determine another weighting of the phrase and other product categories corresponding to the parent node based on numbers of products included in product categories corresponding to the node and the parent node respectively. Based on the two weightings, the server 206 may calculate the relevant value between the phrase and the corresponding product category. For each node, the relevant value between each phrase of the product title information and the corresponding product category may be stored.

For example, to determine a relevancy between each phrase and the flower pot 110, the server 206 may determine the plant gardening 104 as the parent node. For product title information included in the flower pot 110, the server 206 may calculate the relevant value between each phrase of the product title information and the flower pot 110. To determine a relevancy between each phrase and the plant gardening 104, the server 206 may identify the parent node of the plant gardening 104 as the root node 102. For product title information of each product included in the plant gardening node 104, the server 206 may calculate the relevant value between each phrase and the plant gardening 104. In some embodiments, the server 206 may calculate relevant values starting from leaf nodes to the root node or from the root node to the leaf nodes.

Suppose that a product with an ID "1000" is associated with the bulb flower node 114. As results, according to the product category tree 100, the bulb flower node 114 is the leaf node, and the flower pot node 110 is its parent node. Further suppose that the title information of the product 1000 is "Potable Hydroponics Purple Hyacinth Bulbs." As results, the server 206 may conduct word segmentation on the title information, generate phrases based on "Hyacinth." and determine a relevant value between phrases including "Hyacinth" and the bulb flower node 114.

Further suppose that the number of products related to the product category corresponding to the flower pot node 110 is 1,623,912 and the number of products related to the product category corresponding to the bulb flower node 114 is 104, 286. In addition, the number of occurrences of the phrase "hyacinth" in the product title information of products of the bulb flower node 114 is 6,588, and the number in the product title information of products of the flower pot node 110 is 20,683. As results, a weighting of the product category of the bulb flower node 114 regarding the phrase "hyacinth" is 6.3% (i.e., 6588/104286). Another weighting of other products of the flower pot lode 110 is 0.1% (i.e., (20683−6588)/ 0623912−104286)). Therefore the relevant value between the phrase "hyacinth" and the product category of the bulb flower 114 is 85.3%, [6588/104286−(20683−6588)/(1623912− 104286)]/(6588/104286)). Similarly, the server 206 may determine the relevant value between the phrase "hyacinth" and the product category of the flower pot node 110.

In some embodiments, the phrase may include multiple word segments (e.g., "Purple Hyacinth" or "Hyacinth Hyacinth Bulbs"). For example, for the digital product and the digital product accessory of 3C electronics, relevancies between different words of product title information and different product categories may be similar. It may be difficult to determine to which product category a product belongs based on a single word segment for each product category. For example, for the product title information including "genuine Samsung Galaxy S i9000 mobile phone battery", it can determine that a relevancy between the product category "mobile phone" and the product information, and another relevancy between the product category "mobile phone battery" and the product information, are substantially similar. To solve the problem, the server 206 may determine a relevancy between a phrase comprising at least two word segments for each product category. For example, the server 206 may determine a relevancy between the phrase "mobile phone battery" and the product category "mobile phone battery."

In some embodiments, a relevancy between a phrase comprising a word segment and each product category may be set as a one-order vector, and a relevancy between a phrase comprising at least two words and each product category may be set as a two-order vector.

After determining and storing the relevant value between each phrase and each product category, the server 206 may determine a product category corresponding to product title information that is provided by, for example, the user 202.

Figure 5:
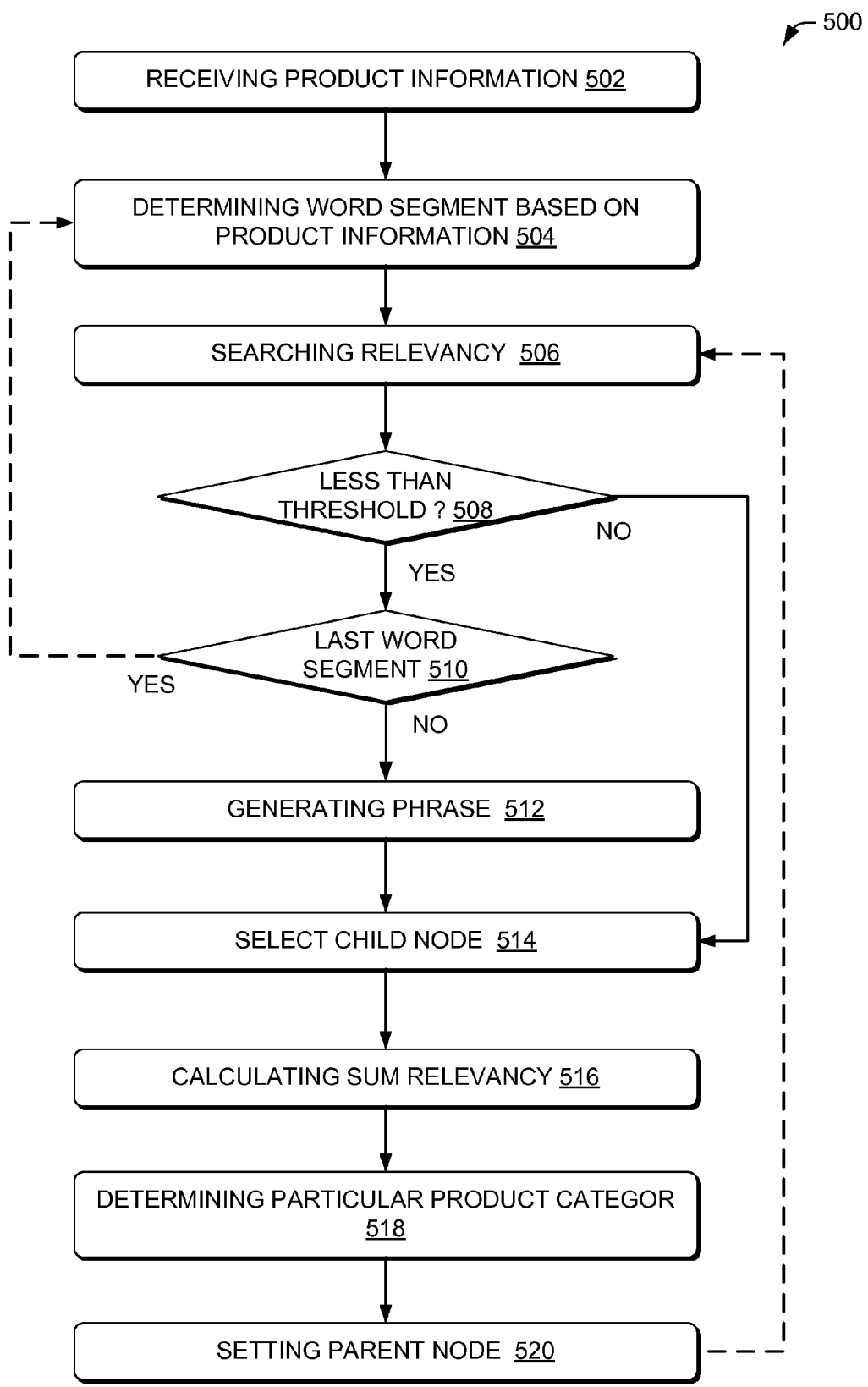
FIG. 5 is a flow diagram of another illustrative process to determine product category information.

FIG. 5 is a flow diagram of another illustrative process 500 to determine product category information. At 502, the server 206 may receive product information that may include product title information. For example, the user device 204 may transmit the product information to the server 206, and request for product category determination.

At 504, the server 206 may determine word segments based on the received product title information. Each word segment may be used for product category determination. In some embodiments, the server 206 may unify the product title information and determine a character standard corresponding to each character of the product title information. For example, when the product information has both upper case letters and lower case letters, the server 206 may convert lower case letters upper case letters if the standard is upper case. The server may then conduct word segmentation on the product title information, and remove certain word segment based on a non-useable word segment table to obtain word segments for product category determination.

At 506, the server 206 may determine a segment relevancy between a word segment and each child node of the root node or a parent node. The server 206 may determine the segment relevancy based on stored relevant values between phrases and each child node.

At 508, the server 206 may determine whether the segment relevancy falls below a predetermined threshold. If the segment relevancy is less than the threshold (i.e., the "YES" branch from 508), the server 206 may determine whether the word segment is the last word of the product title information at 509. If the server 206 determine that the word segment is the last word segment of the product title information (i.e., the "YES" branch from 510), the operations 504 to 510 may be performed by a loop process (via dashed line from the operation 510 that leads back to the operation 504). The server 206 may select another word segment for product category determination. If the word segment is not the last word segment (i.e., the "NO" branch from 510), the server 206 may generate a phrase including the word segment and at least another word segment after the word segment at 512.

If the segment relevancy is not less than the threshold (i.e., the "NO" branch from 508), the server 206 may select child nodes corresponding to each word segment at 514. The server may select child nodes that have relevant values greater than a predetermine value regarding the word segment. In some embodiments, the server may select child nodes having relevant values greater than other child nodes regarding the word segment. In some embodiments, the server 206 may search a relevancy regarding the phrase generated from the operation 512, and then determine the child node.

At 516, the server 206 may calculate one or more sum relevancies for a product category corresponding to each selected child node and the product title information. In some embodiments, the server 206 may determine a first sum relevancy based on relevancies between each word segment of the product title information and the selected product category. In some embodiments, the server 206 may determine a second sum relevancy based on relevancies between each phrase derived from the word segments and the selected product category.

At 518, the server 206 may determine a particular product category corresponding to the product title information based on sum relevancies. This particular product category may have the greatest sum relevancy. In some embodiments, the server 206 may calculate a total sum relevancy based on the first sum relevancy and the second sum relevancy and the particular product category may have the greatest total sum relevancy.

At 520, the server 206 may set the node corresponding to the particular product category as a parent node and then determine corresponding child nodes. The operations 506 to 520 may be performed by a loop process (via dashed line from the operation 520 that leads back to the operation 506) until the product title information is associated to a product category corresponding to a leaf node.

For example, suppose that product title information of a product comprises word segments A, B, and C, and the product category setting number is 3. In addition, the relevance between each word segment and each product category contained in the product title information is provided in table 1 below.

|    | R1  | R2  | R3  | R4  | R5  |
|----|-----|-----|-----|-----|-----|
| A  | 50% | 83% | 62% |     |     |
| B  | 40% |     | 20% |     | 37% |
| C  | 42% | 57% |     | 32% |     |
| AB | 20% | 40% |     |     | 30% |
| AC | 10% | 30% | 40% |     |     |

Further suppose that the product categories corresponding to child nodes contained in the root node are R1, R2, R3, the relevance between the word A and product categories R1, R2 and R3 are determined as 50%, 83% and 62%, the relevance between the word B and product categories R1, R3 and R5 are determined as 40%, 20% and 37%, and the relevance between the word C and product categories R1, R2 and R4 are determined as 42%, 57% and 32%. Suppose that the set relevance threshold is 70%.

Accordingly, the relevancy between the phrase constituted by word A and word B and the product categories R1, R2 and R5 are determined as 20%, 40% and 30%, and the relevancy between the phrase constituted by word A and word C and the product categories R1, R2 and R3 are determined as 10%, 30% and 40%. Furthermore, the first sum relevancy between the product title information and the product category R1 is 132%, the first sum relevancy between the product title information and the product category R2 is 140%, the first sum relevancy between the product title information and the product category R3 is 82%, the first sum relevancy between the product title information and the product category R4 is 32%, and the first sum relevancy between the product title information and the product category R5 is 37%.

In addition, the second sum relevancy between the product title information and the product category R1 is 30%, the second sum relevancy between the product title information and the product category R2 is 70%, the second sum relevancy between the product title information and the product category R3 is 40%, and the second sum relevancy between the product title information and the product category R5 is 30%.

Accordingly, the sum relevancy between the product title information and the product category R1 is 162%; the sum relevancy between the product title information and the product category R2 is 210%; the sum relevancy between the product title information and the product category R3 is 122%; the sum relevancy between the product title information and the product category R4 is 32%; and the sum relevancy between the product title information and the product category R5 is 67%. Therefore, the node comprising the product information is the node corresponding to the product category R2. The server 206 may then set the node as a parent node, determine child nodes of the parent node, and determines another node of the newly determined child nodes corresponding to the product title information until the product title information is associated to a product category corresponding to a leaf node.

Figure 6:
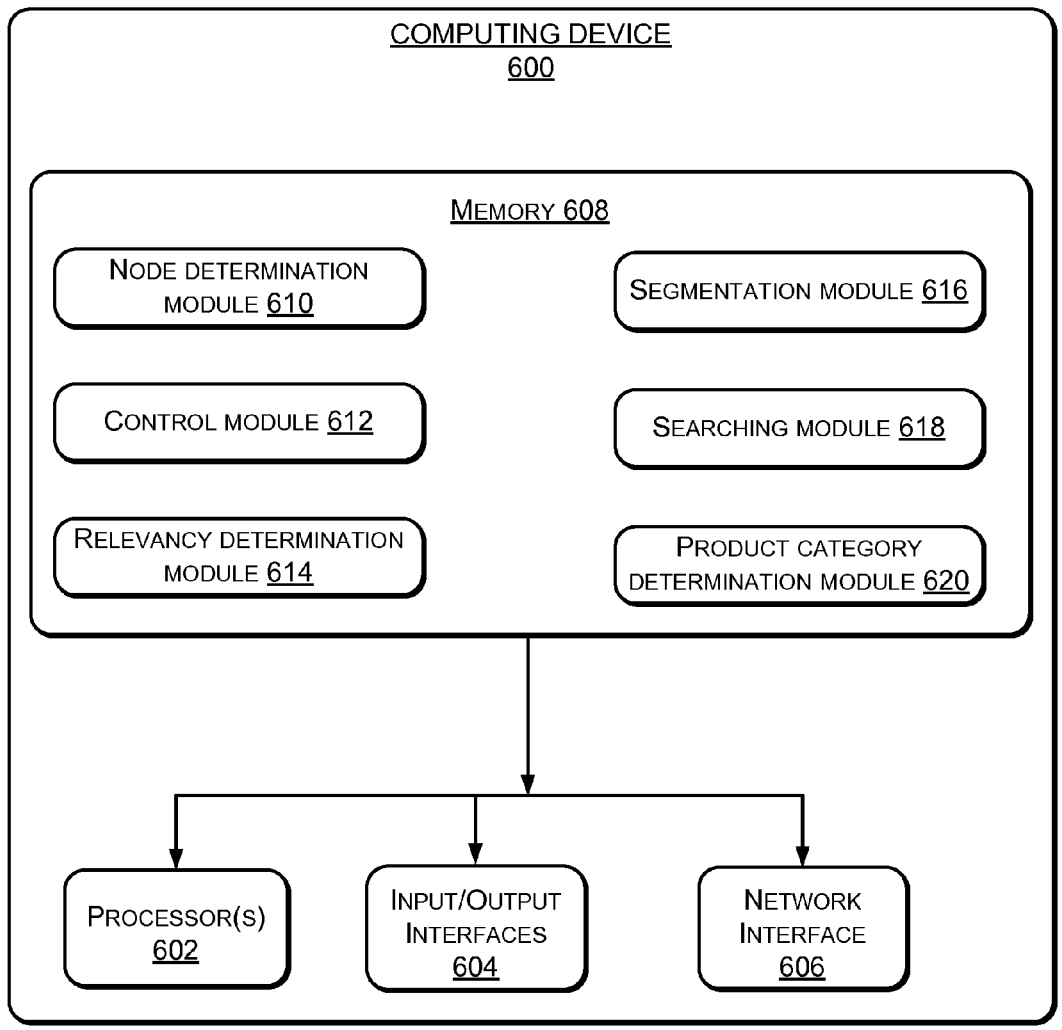
FIG. 6 is a block diagram of an illustrative computing device that may be deployed in the environment shown in FIG. 2.

FIG. 6 is a block diagram of an illustrative computing device 600 that may be deployed in the environment shown in FIG. 2. The server 206 may be configured as any suitable server(s). In one exemplary configuration, the server 206 include one or more processors 602, input/output interfaces 604, network interface 606, and memory 608.

The memory 608 may include computer-readable media in the form of volatile memory, such as random-access memory (RAM) and/or non-volatile memory, such as read only memory (ROM) or flash RAM. The memory 608 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 608 in more detail, the memory 608 may store a mode determination module 610, a control module 612, a relevancy determination module 614, a segmentation module 616, a searching module 618, and a product category determination module 620. The node determination module 610 may determine a node (e.g., child nodes and parent nodes) corresponding to a product within a product category tree.

The control module 612 may conduct word segmentation on the product title information and determine each phrase corresponding to product title information. The phrase may include at least a word segment. For each phrase, the control module 612 may determine a relevancy between the phrase and a product category corresponding to the node according to an occurrence of the phrase in product title information contained in a product category corresponding to the corresponding parent node, an occurrence of the phrase in product title information contained in a product category corresponding to the node, a number of the product contained in a product category corresponding to the node and a number of the product contained in a product category corresponding to the parent node.

In some embodiments, the server 206 may store relevance tables. The tables may include a table having relevancies between each word and each product category, and another table having relevancies between each phrase constituted by at least two words and each product category. Each phrase may include one or more word segments. The server 206 may determine the relevance between each phrase and each child node according to each child node connected to the root node and the preserved relevance between each child node and each phrase. The server 206 may determine the child node including the product title information according to the relevance between each phrase of the product title information and each child node. After that, the server 206 may set the child node as a parent node and determine child nodes of the parent node. Accordingly, the relevancy between each phrase of the product title information and each child node may be determined and the child node containing the product title information may be determined until the product title information of a product is associated with to a product category corresponding to a leaf node.

In some embodiments, the control module 612 may determine a first weighting between the phrase and a product category corresponding to the node according to an occurrence of the phrase in product title information contained in a product category corresponding to the node and a product number contained in a product category corresponding to the node. The control module 612 may determine a second weighting between the phrase and a product category corresponding to the father node according to an occurrence of the phrase in product title information contained in a product category corresponding to the father node, an occurrence of the phrase in product title information contained in a product category corresponding to the node, a number of the product contained in a product category corresponding to the node and a number of the product contained in a product category corresponding to the parent node. The control module 612 may determine a difference between the first weighting and the second weighting, and determine the relevancy between the phrase and a product category corresponding to the node according to a quotient of the difference and the first weighting.

In some embodiments, the control module 612 may determine the first weight according to a quotient of an occurrence of the phrase in product title information contained in a product category corresponding to the node and a product number contained in a product category corresponding to the node.

In some embodiments, the control module 612 may determine a first difference between an occurrence of the phrase in product title information contained in a product category corresponding to the father node and an occurrence of the phrase in product title information contained in a product category corresponding to the node. The control module 612 may also determine a second difference between a product number contained in a product category corresponding to the father node and a product number contained in a product category corresponding to the node, and then determine the second weight according to a quotient of the first difference and the second difference.

In some embodiments, a relevancy between a phrase and a product category may be stored in the server 206. The server 206 may search and determine the product category to which the product belongs by the on-line real-time prediction system. The on-line on-time prediction system may be included in the server 206. For example, the server 206 may include an Apache module. The Apache module may be implemented by the control module 612 and the node determination 610 as well as the relevancy determination module 614.

The relevancy determination module 614 may store relevancies between phrases and product categories corresponding to nodes of the product category tree. The segmentation module 616 may receive product title information, conduct word segmentation on the product title information and determine each phrase corresponding to the product title information.

The searching module 618 may search relevancies between phrases and child nodes according to relevant values between reserved phrases and product categories corresponding to nodes. The product category determination module may determine a node containing the product information according to searched relevancies between phrases and child nodes, and set a child node as a parent node.

In some embodiments, the searching module 618 may determine a child node corresponding to each product category contained in the phrase according to the relevancy between each phrase reserved and each product category. The search module 618 may set the relevance between the stored phrase and a product category corresponding to the child node as a relevancy between the searched phrase and the child node. In some embodiments, the searching module 618 may determine whether the searched relevance between the phrase and the child node is greater than a preset relevance threshold.

The product category determination module 620 may determine a child node of the parent node until the product title information of a product is associated with a product category corresponding to a leaf node. In some embodiments, the product category determination module 620 may select child nodes having relevancies greater than a predetermined value corresponding to the searched phrase. The product category determination module 620 may determine a sum relevancy between the product title information and the product category based on a relevancy between each phrase of the product title information and the product category. The product category determination module 620 may determine a product category having the greatest sum relevance as a product category corresponding to a node containing the product information.

The embodiments in this disclosure are merely for illustrating purposes and are not intended to limit the scope of this disclosure. A person having ordinary skill in the art would be able to make changes and alterations to embodiments provided in this disclosure. Any changes and alterations that persons with ordinary skill in the art would appreciate fall within the scope of this disclosure.

What is claimed is:

1. One or more computer-readable media storing computer-executable instructions that, when executed by one or more processors, cause the one or more processors to perform acts comprising:
   receiving product information associated with a product;
   conducting word segmentation on the product information to generate a phrase that includes one or more word segments;
   finding relevancies between the phrase and product categories corresponding to multiple nodes having a parent node in a product category tree, each of the multiple nodes corresponding to a respective product category; and
   selecting a node from the multiple nodes based on the relevancies, the selected node being associated with a particular product category having a respective relevancy with the phrase greater than a specific threshold.

2. The one or more computer-readable media of claim 1, wherein the parent node is a root node of the product category tree.

3. The one or more computer-readable media of claim 1, wherein the acts further comprise:
   determining whether the selected node is a leaf node of the product category tree;
   in the event that the selected node is the leaf node:
      associating the product information with the particular product category corresponding to the selected node, the product information including title information of the product;
   in the event that the selected node is not the leaf node:
      determining that the selected node has one or more leaf nodes;
      determining a leaf node of the one or more leaf nodes based on respective one or more relevancies between the phrase and one or more product categories corresponding to the one or more leaf nodes; and
      associating the title information with a product category corresponding to the leaf node of the one or more leaf nodes.

4. The one or more computer-readable media of claim 3, wherein the acts further comprise:
   determining whether the selected node is a leaf node of the product category tree; and
   in the event that the selected node is not the leaf node:
      determining that the selected node does not have a leaf node; and
      determining one or more child nodes of the selected node.

5. The one or more computer-readable media of claim 1, wherein the acts further comprise:
- determining whether the relevancies are less than a predetermined threshold;
- in the event that the relevancies are less than the predetermined threshold, generating another phrase based on the one or more segments; and
- finding other relevancies between the other phrase and the product categories corresponding to the multiple nodes.

6. The one or more computer-readable media of claim 1, wherein the selecting the node comprises:
- selecting one or more nodes from the multiple nodes, the one or more nodes corresponding to one or more product categories that have relevancies with the phrase greater than a predetermined value;
- calculating one or more sum relevancies between the phrase and the one or more product categories corresponding to the one or more nodes; and
- selecting the node from the one or more nodes based on the one or more sum relevancies.

7. The one or more computer-readable media of claim 6, wherein the one or more sum relevancies comprise a sum relevancy that is calculated based on relevancies between each of the one or more word segments of the phrase and the one or more product categories corresponding to the selected one or more nodes.

8. The one or more computer-readable media of claim 6, wherein the one or more sum relevancies comprise a sum relevancy that is calculated based on relevancies between each of one or more phrases and the one or more product categories corresponding to the selected one or more nodes, the one or more phrases being generated based on the one or more word segments.

9. The one or more computer-readable media of claim 1, wherein the acts further comprise:
- setting the selected node as a parent node; and
- determining one or more child nodes of the parent node.

10. A computer-implemented method comprising:
- receiving product information;
- forming a phrase including one or more word segments that are generated based on the product information;
- determining one or more nodes of a product category tree, the one or more nodes connecting with one parent node and having relevancies associated with the phrase greater than a predetermined threshold; and
- determining a node of the one or more nodes based on relevancies between each of the one or more word segments and product categories corresponding to the one or more nodes.

11. The computer-implemented method of claim 10, wherein the determining the node of the one or more nodes comprises determining the node of the one or more nodes based further on each of one or more phrases and the product categories corresponding to the one or more nodes, the one or more phrases being generated based on the one or more word segments.

12. The computer-implemented method of claim 10, further comprising:
- determining that the node has one or more leaf nodes;
- determining a leaf node of the one or more leaf nodes based on relevancies between the phrase and product categories corresponding to the one or more leaf nodes; and
- associating the product information with a product category corresponding the leaf node.

13. The computer-implemented method of claim 10, further comprising:
- determining that the node has no leaf node; and
- determining one or more child nodes of the node.

14. The computer-implemented method of claim 10, wherein the one parent node is a root node of the product category tree.

15. A computer-implemented method comprising:
- determining a particular node and a parent node of the particular node that are associated with a product category tree, the particular node corresponding to a product category that includes multiple product titles;
- conducting word segmentation on a product title of the multiple product titles to generate a phrase including one or more word segments; and
- calculating a relevancy between the phrase and the product category based on relationship between the phrase and the multiple product titles, the calculating comprising calculating based on a number that the phrase is contained in the multiple product titles.

16. The computer-implemented method of claim 15, wherein calculating the relevancy further comprises calculating based on:
- a number of the multiple product titles included; and
- a number of product titles that are included in a product category corresponding to a parent node of the particular node.

17. The computer-implemented method of claim 15, wherein calculating the relevancy further comprises calculating based on a weighting value that is calculated based on a number that the phrase is contained in the product category and a number of the multiple product titles included in the product category.

18. The computer-implemented method of claim 17, wherein the weighting value is calculated based further on:
- a number that the phrase is contained in a product category corresponding to a parent node of the particular node; and
- a number of product titles that are included in the product category corresponding to the parent node of the particular node.

19. The computer-implemented method of claim 15, further comprising storing the relevancy in a database associated with a cloud computing platform.

\* \* \* \* \*